(12) United States Patent
Clarke et al.

(10) Patent No.: US 10,372,583 B2
(45) Date of Patent: *Aug. 6, 2019

(54) ENHANCED POLICY EDITOR WITH COMPLETION SUPPORT AND ON DEMAND VALIDATION

(71) Applicant: International Business Machines Corporation, Armonk, NY (US)

(72) Inventors: Matthew J. Clarke, Berkshire (GB); Doina L. Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,725

(22) Filed: May 9, 2018

(65) Prior Publication Data

US 2018/0260300 A1    Sep. 13, 2018

Related U.S. Application Data

(63) Continuation of application No. 15/004,124, filed on Jan. 22, 2016, now Pat. No. 10,025,689.

(51) Int. Cl.
*G06F 8/33*        (2018.01)
*G06F 11/36*       (2006.01)
(Continued)

(52) U.S. Cl.
CPC .......... *G06F 11/3604* (2013.01); *G06F 8/315* (2013.01); *G06F 8/33* (2013.01);
(Continued)

(58) Field of Classification Search
CPC ................. G06F 11/3604; G06F 17/30; G06F 17/30905; G06F 8/33; G06F 8/315;
(Continued)

(56) References Cited

U.S. PATENT DOCUMENTS 5,537,630 A  *  7/1996  Berry ........................ G06F 8/33
                                                    715/763
6,636,866 B1    10/2003  Katiyar et al.
(Continued)

FOREIGN PATENT DOCUMENTS

WO        2004006059 A2      1/2004

OTHER PUBLICATIONS

"Java Management Extensions", Wikipedia, the free encyclopedia, last modified on Oct. 12, 2015, at 21:29, Accessed on Dec. 3, 2015 10:05 AM, 3 pages, <https://en.wikipedia.org/wiki/Java_Management_Extensions>.

(Continued)

*Primary Examiner* — Ziaul A Chowdhury
(74) *Attorney, Agent, or Firm* — Christopher K. McLane

(57) ABSTRACT

In an approach to providing completion support and on demand validation in a web tool that operates on live resources, one or more computer processors create one or more lists of content, where the one or more lists of content include one or more references to one or more runtime objects. The one or more computer processors parse the one or more lists of content. The one or more computer processors populate one or more lists of one or more choices with the parsed one or more lists of content. The one or more computer processors create one or more callbacks for one or more runtime objects referenced by the one or more lists of one or more choices.

20 Claims, 4 Drawing Sheets

(51) Int. Cl.
*G06F 16/00* (2019.01)
*G06F 16/23* (2019.01)
*G06F 8/30* (2018.01)
*G06F 16/957* (2019.01)
*G06F 16/9535* (2019.01)

(52) U.S. Cl.
CPC .......... *G06F 16/00* (2019.01); *G06F 16/2365* (2019.01); *G06F 16/9535* (2019.01); *G06F 16/9577* (2019.01)

(58) Field of Classification Search
CPC ............. G06F 16/9577; G06F 16/9535; G06F 16/2365; G06F 16/00
See application file for complete search history.

(56) References Cited

U.S. PATENT DOCUMENTS

| | | | |
|---|---|---|---|
| 6,779,154 B1* | 8/2004 | Nussbaum | G06F 16/258 715/234 |
| 6,915,454 B1 | 7/2005 | Moore et al. | |
| 7,203,909 B1 | 4/2007 | Horvitz et al. | |
| 7,281,236 B1 | 10/2007 | Galvin et al. | |
| 7,340,714 B2 | 3/2008 | Upton | |
| 7,451,352 B1 | 11/2008 | Moore et al. | |
| 7,562,341 B2 | 7/2009 | Kovachka-Dimitrova et al. | |
| 8,561,176 B1* | 10/2013 | Dalcher | G06F 11/3604 726/22 |
| 8,756,579 B1 | 6/2014 | Colton et al. | |
| 8,954,553 B1 | 2/2015 | Colton et al. | |
| 9,219,774 B2 | 12/2015 | Jolfaei | |
| 9,335,976 B1* | 5/2016 | Verwaest | G06F 8/315 |
| 9,557,967 B1 | 1/2017 | Clarke et al. | |
| 9,600,516 B1 | 3/2017 | Clarke et al. | |
| 9,940,217 B2 | 4/2018 | Clarke et al. | |
| 2002/0120677 A1 | 8/2002 | Goward et al. | |
| 2003/0018827 A1 | 1/2003 | Guthrie et al. | |
| 2003/0088520 A1 | 5/2003 | Bohrer | |
| 2003/0225840 A1 | 12/2003 | Glassco | |
| 2004/0019584 A1 | 1/2004 | Greening et al. | |
| 2004/0250258 A1 | 12/2004 | Raghuvir et al. | |
| 2005/0081192 A1 | 4/2005 | DeLine et al. | |
| 2005/0256933 A1 | 11/2005 | Millington et al. | |
| 2007/0162456 A1* | 7/2007 | Agassi | G06F 16/9535 |
| 2007/0168957 A1 | 7/2007 | Li et al. | |
| 2007/0169027 A1 | 7/2007 | Drepper | |
| 2007/0234195 A1 | 10/2007 | Wells | |
| 2007/0239796 A1 | 10/2007 | Ju et al. | |
| 2008/0127154 A1 | 5/2008 | Drepper | |
| 2008/0301644 A1 | 12/2008 | Drepper | |
| 2009/0182787 A1* | 7/2009 | Parkinson | G06F 16/00 |
| 2010/0042670 A1 | 2/2010 | Kamalakantha et al. | |
| 2010/0185928 A1 | 7/2010 | Mathew et al. | |
| 2010/0186003 A1* | 7/2010 | Shapiro | G06F 11/3604 717/126 |
| 2010/0235817 A1 | 9/2010 | Kahlon et al. | |
| 2011/0126119 A1* | 5/2011 | Young | G06F 16/9577 715/744 |
| 2011/0154236 A1 | 6/2011 | Stoeck et al. | |
| 2011/0185282 A1 | 7/2011 | Mahmood et al. | |
| 2011/0239104 A1 | 9/2011 | Prasad et al. | |
| 2011/0307864 A1* | 12/2011 | Grechanik | G06F 11/3604 717/124 |
| 2013/0311973 A1* | 11/2013 | Rice | G06F 11/3664 717/124 |
| 2014/0026023 A1* | 1/2014 | Cabanier | G06F 17/211 715/202 |
| 2014/0223003 A1 | 8/2014 | Varney et al. | |
| 2014/0229843 A1* | 8/2014 | De Armas | G06F 3/048 715/739 |
| 2014/0380283 A1 | 12/2014 | Hu et al. | |
| 2016/0070637 A1 | 3/2016 | Furtwangler et al. | |
| 2016/0080493 A1 | 3/2016 | Roth et al. | |
| 2016/0085662 A1* | 3/2016 | Huang | G06F 11/3668 717/124 |
| 2016/0173537 A1 | 6/2016 | Kumar et al. | |
| 2016/0357789 A1* | 12/2016 | Contessa | G06F 16/2365 |
| 2017/0212827 A1 | 7/2017 | Clarke et al. | |

OTHER PUBLICATIONS

"JustGoscha/allmighty-autocomplete", Github, Jan. 22, 2015, Accessed on Dec. 3, 2015 10:40 AM, 5pages, <https://github.com/JustGoscha/allmighty-autocomplete>.

"Visual Studio Team Services", Visual Studio, Accessed on Dec. 3, 2015 9:33 AM, 5 pages, <https://www.visualstudio.com/products/visual-studio-team-services-vs>.

Rooding, "How to Implement Validation Callbacks iln AngularJS 1.2", Nov. 26, 2014, 7 pages, retrieved from <http://blog.xedbia.com/how-to-impement-validation-calibacks-in-angularjs-1-2/>.

Ibrahim et al.; "Supporting Operating system Kernel Data Disambiguation Using Points-to Analysis", ASE'12, Sep. 3-7, 2012, Essen, Germany, Copyright 212, ACM, 4 pages.

Bao et al., "Extracting Reusable Services from Legacy Object-oriented Systems", 26th IEEE International Conference on Software Maintenance in Timsora, Romania, © 2010 IEEE, 5 pages.

Cuadrado et al., "The Program is the Model: Enabling Transformations@run.time", 2012, 20 pages.

Liang et al., Slicing Objects Using System Dependence Graphs, 1998, 10 pages.

\* cited by examiner

ENHANCED POLICY EDITOR WITH COMPLETION SUPPORT AND ON DEMAND VALIDATION

BACKGROUND OF THE INVENTION

The present invention relates generally to the field of software development tools, and more particularly to an enhanced policy editor with completion support and on demand validation.

An integrated development environment (IDE) is a software application that provides comprehensive facilities to computer programmers for software development. An IDE may consist of a source code editor, build automation tools, and a debugger. IDEs may also include intelligent code completion. IDEs are often designed to maximize programmer productivity by providing tight-knit components with similar user interfaces. IDEs present a single program in which all development is done.

In computer programming, a callback is a piece of executable code that is passed as an argument to other code, which is expected to call back (execute) the argument at some convenient time. The invocation may be immediate as in a synchronous callback, or it may happen at a later time as in an asynchronous callback. Callbacks may be used to program asynchronous applications in windowing systems. The application supplies a reference to a specific custom callback function for the operating system to call, which then calls this application-specific function in response to events like mouse clicks or key presses. Callbacks can be used to notify a client of a web service that an event has occurred. When defining a callback, a user is defining a message that the web service will send to the client to notify the client of an event that has occurred in the user's web service or in an enterprise system.

Representational state transfer (REST) is the software architectural style of the World Wide Web. REST gives a coordinated set of constraints to the design of components in a distributed hypermedia system that can lead to a higher-performing and more maintainable architecture. REST interfaces with external systems using resources identified by a Uniform Resource Identifier (URI), which can be operated upon using standard Hypertext Transfer Protocol (HTTP) verbs.

SUMMARY

Embodiments of the present invention disclose a method, a computer program product, and a system for providing completion support and on demand validation in a web tool that operates on live resources. The method may include one or more computer processors creating one or more lists of content, where the one or more lists of content include one or more references to one or more runtime objects. The one or more computer processors parse the one or more lists of content. The one or more computer processors populate one or more lists of one or more choices with the parsed one or more lists of content. The one or more computer processors create one or more callbacks for one or more runtime objects referenced by the one or more lists of one or more choices.

DETAILED DESCRIPTION

An Integrated Development Environment (IDE) includes many useful tools for software development, including automatic builds, quick fix, and content assist. For example, when a developer edits a Java® class, the content assist function can inform the developer of a list of methods that a certain object has, based on syntax and language rules. As web tools become more prevalent, software administrators may perform increasingly complex tasks, such as defining and attaching policies to various objects, instantiating templates, and performing configuration tasks to deploy simple solutions. Challenges exist for creating an IDE-like experience for the user of web tools, as the web tools operate on live resources that may become unavailable or whose properties may change at any time. Embodiments of the present invention recognize that efficiency may be gained by providing a web tool set to a software administrator that includes IDE-like functions, such as completion support, e.g., content assist, and on demand validation. Embodiments of the present invention may also recognize that an improved web tool set may reduce servicing costs by avoiding build and lifecycle problems that may be difficult to catch and debug. Implementation of embodiments of the invention may take a variety of forms, and exemplary implementation details are discussed subsequently with reference to the Figures.

Figure 1:
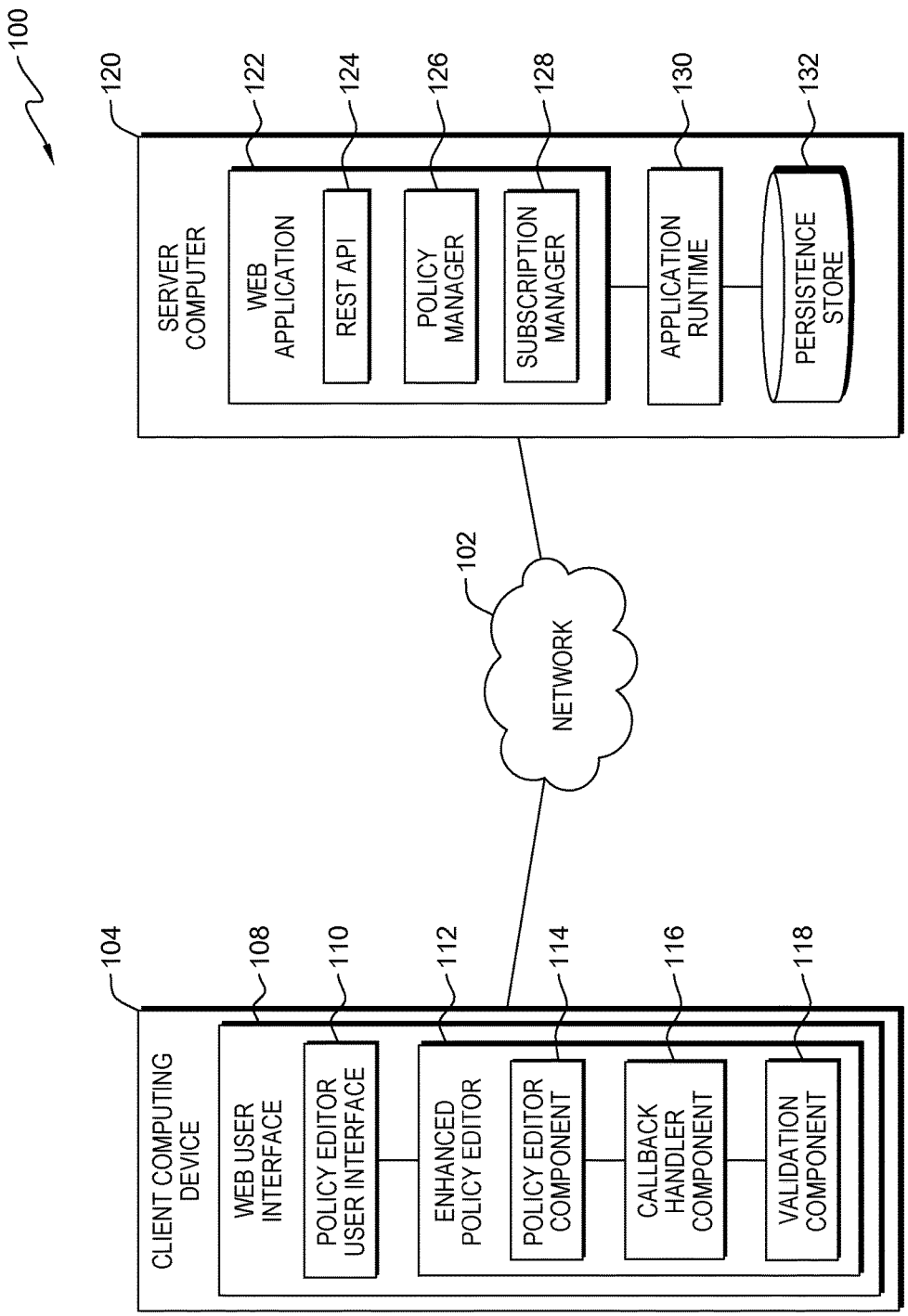
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 120, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 120, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. In general, client computing device 104 represents any programmable electronic device or combination of programmable electronic devices capable of executing machine readable program instructions and communicating with other computing devices (not shown) within distributed data processing environment 100 via a network, such as network 102. Client computing device 104 includes web user interface 108.

Web user interface 108 includes policy editor user interface 110. In one embodiment, web user interface 108 and policy editor user interface 110 may each be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, web user interface 108 and policy editor user interface 110 may also each be mobile application software that provides an interface for a user of client computing device 104 with server computer 120. Mobile application software, or an "app," is a computer program designed to run on smart phones, tablet computers and other mobile devices. Web user interface 108 enables a user of client computing device 104 to perform configuration tasks related to one or more applications on server computer 120. In one embodiment, web user interface 108 may be viewed using a web browser. In one embodiment, policy editor user interface 110 is a task focused user interface that enables a user of client computing device 104 to edit policies in a simple form, such as editing a file or document and its contents. Web user interface 108 also includes enhanced policy editor 112.

Enhanced policy editor 112 is a web tool for software administrators that enables an IDE-like experience for editing resources, such as a policy, that reference dynamic objects that can change state at any time, specifically by providing content assist via completion support as well as on demand validation. In another embodiment, a user may use enhanced policy editor 112 to edit other types of documents that reference live resources identified via a uniform resource identifier (URI) such as an application that references components via URIs. As a user of client computing device 104 creates a policy for a web application, such as web application 122, enhanced policy editor 112 creates a list of content for a policy definition using representational state transfer (REST) application programming interface (API) calls. Enhanced policy editor 112 parses the content retrieved by the REST API calls and populates lists of choices for the policy definition. Enhanced policy editor 112 may apply type or predicate filtering to the content before populating a list of choices. Enhanced policy editor 112 sets up callbacks for runtime objects that the policy references. Enhanced policy editor 112 also builds a dependency analysis tree for each runtime object. Once a policy built with enhanced policy editor 112 is in place, or while a user is editing a policy built using enhanced policy editor 112, enhanced policy editor 112 can receive a notification of a change of one or more of the runtime objects referenced by the policy. Enhanced policy editor 112 then runs a validation against the affected objects. If any of the objects have become invalid due to the change, enhanced policy editor 112 marks the objects as invalid and outputs the results of the validation. In the depicted embodiment, enhanced policy editor 112 includes components that perform the various functions within enhanced policy editor 112. In the embodiment, enhanced policy editor 112 includes policy editor component 114, callback handler component 116, and validation component 118. In another embodiment, enhanced policy editor 112 is a fully integrated tool that includes the functions of the previously listed components, but the components are not individual entities. Enhanced policy editor 112 is depicted and described in further detail with respect to FIG. 2 and FIG. 3.

Policy editor component 114 is responsible for performing REST calls to get the deployed artifacts to a server computer (not shown) within distributed data processing environment 100, that a user may want to include in a policy. Each time a user initiates a content assist function, for example, by pressing "Ctrl+space" on a keyboard associated with client computing device 104, policy editor component 114 issues a REST call that handles responses to populate a list of available options for the user.

Callback handler component 116 performs two functions. While the user is creating or editing a policy, callback handler component 116 sets up listeners to notifications that may be received from server computer 120. For example, if a policy references a particular resource, callback handler component 116 monitors for any notifications that may be relevant to the resource, such as the resource being changed or unavailable. In addition, when enhanced policy editor 112 receives a notification relevant to a resource referenced by a policy, callback handler component 116 identifies the notification context, i.e., determines to which object or scope the notification applies. Then callback handler component 116 determines whether any valid callbacks exist that may be associated with the notification, and, if so, then callback handler component 116 runs one or more callback functions that resolve the receipt of the notification.

Validation component 118 is the validation that enhanced policy editor 112 runs as a result of a response to a callback. Validation component 118 may run REST calls to get the latest state of the resource in question, and then visually display any errors via web user interface 108.

In one embodiment, policy editor component 114, callback handler component 116, and validation component 118 exist within one or more Javascript® libraries. The three components each are an entity that underlies policy editor user interface 110 and not explicitly units of function with which the user interacts.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. Server computer 120 includes web application 122, application runtime 130, and persistence store 132.

Web application 122 is one of a plurality of software applications running on server computer 120 that may be edited or configured by a software administrator, for example, a user of client computing device 104. In the depicted embodiment, web application 122 runs on server computer 120, and a user of client computing device 104 can edit a policy of web application 122 via web user interface 108. Web application 122 includes three components: REST API 124, policy manager 126, and subscription manager 128.

REST API 124 acts as a gateway for policy editor user interface 110 to interface with web application 122. Web application 122 exposes REST API 124 to client computing device 104. REST API 124 provides a callable interface to which operations can be performed on server computer 120 which may be based on a URI on which REST API 124 operates. REST API 124 may, for example, save a new or update an existing policy such that the policy is persisted from the definition in web user interface 108 to a permanent store, such as persistence store 132. REST API 124 may interact with policy manager 126 or subscription manager 128. In addition, REST API 124 may create, read, update, and/or delete a policy.

Policy manager 126 is a component that responds to REST calls by appropriately invoking an application runtime environment, such as application runtime 130. For example, if web application 122 receives a request to update an existing policy, then policy manager 126 may validate the content of the policy document on server computer 120 before passing the request to application runtime 130 to handle.

Subscription manager 128 initiates notifications to one or more subscribed client devices, such as web user interface 108 on client computing device 104, regarding changes in objects or resources referenced by a policy. For example, if a resource becomes unavailable, subscription manager 128 issues a notification to client computing device 104, via web user interface 108. Subscription manager 128 formulates the notification content and sends a notification with that content to client computing device 104. In turn, the notification initiates enhanced policy editor 112, via callback handler component 116. Subscription manager 128 knows a list of one or more client devices that are interested in the affected resource based on open connections to the devices across network 102, and uses the connection to send the notification.

Application runtime 130 is a generic runtime environment for web application 122. Application runtime 130 has responsibilities that may include setting up one or more connections to a database that has stored policy definitions, such as persistence store 132. Additional responsibilities may include retrieving and storing the definitions based on invocation from policy manager 126. Application runtime 130 may also be responsible for enforcing the policies. Application runtime 130 runs the applications for which the user edits policies.

In the depicted embodiment, persistence store 132 resides on server computer 120. In another embodiment, persistence store 132 may reside elsewhere within distributed data processing environment 100 provided web application 122 has access to persistence store 132. Persistence store 132 may be a database, i.e., an organized collection of data. Persistence store 132 can be implemented with any type of storage device capable of storing data and configuration files that can be accessed and utilized by server computer 120, such as a database server, a hard disk drive, or a flash memory. Persistence store 132 stores policy definitions supplied by a user of client computing device 104 via policy editor user interface 110.

Figure 2:
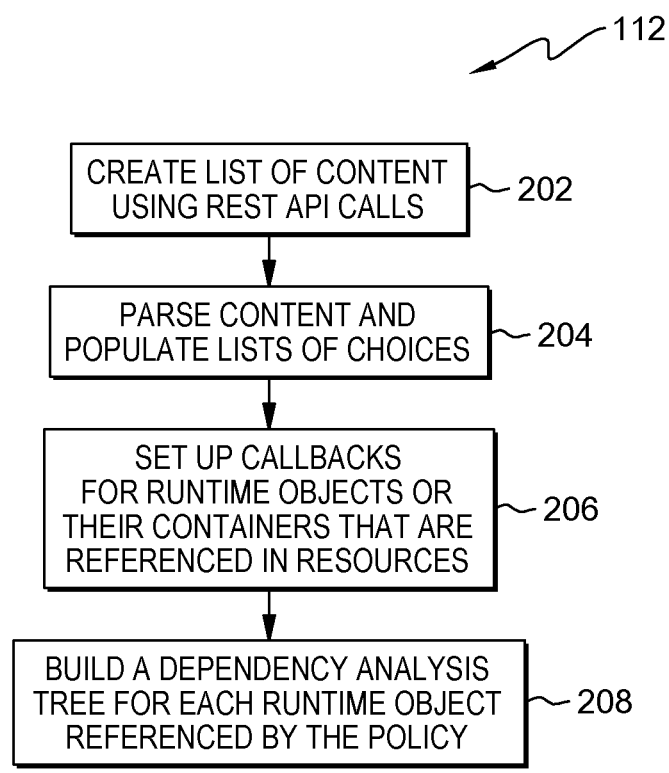
FIG. 2 is a flow diagram depicting steps of an enhanced policy editor, on a client computing device within the distributed data processing environment of FIG. 1, for providing completion support and on demand validation, in accordance with an embodiment of the present invention.

FIG. 2 is a flow diagram depicting steps of enhanced policy editor 112, on client computing device 104 within distributed data processing environment 100 of FIG. 1, for providing completion support and on demand validation, in accordance with an embodiment of the present invention.

As a user of client computing device 104, such as a software administrator, creates or edits a policy associated with an application or program written by a software developer, enhanced policy editor 112 creates a list of content using existing REST API calls (step 202). For example, enhanced policy editor 112 may use a "GET" call to interrogate and retrieve valid components included in a server system. Enhanced policy editor 112 makes REST calls to determine the referenced resources under a server and at each point.

Enhanced policy editor 112 parses the content and populates lists of choices (step 204). Enhanced policy editor 112 uses the created list of content to provide content assist to the user that offers valid choices for various policy edits of URI sections. Enhanced policy editor 112 may parse the content to sort out just the name of the resource since the user may not be interested in other details associated with the resource that may have come back with the REST call, such as the date the resource was created, the date the resource was last modified, the state of the resource, etc. Enhanced policy editor 112 may apply filtering to the parsed content resulting from the REST calls. For example, enhanced policy editor 112 may apply one or more of type filtering or predicate filtering, as would be recognized by one skilled in the art. In an example of type filtering, enhanced policy editor 112 may show only applications. In an example of predicate filtering of applications, enhanced policy editor 112 may show only applications that are currently running or applications without errors. The category of filtering may be user configured or enhanced policy editor 112 may infer the filter category from other parts of the policy definition. In one embodiment, enhanced policy editor 112 parses the content and populates lists of choices via policy editor component 114. After populating one or more lists of one or more choices, enhanced policy editor 112 displays the one or more lists to the user.

Enhanced policy editor 112 sets up callbacks for runtime objects (or their containers) that are referenced in the policy resources (step 206). For each object referenced by the policy, enhanced policy editor 112 creates a callback such that if the object changes, for example, becomes unavailable or obsolete, enhanced policy editor 112 receives a notification from subscription manager 128. In one embodiment, enhanced policy editor 112 receives a notification from subscription manager 128 via callback handler component 116.

Enhanced policy editor 112 invokes policy manager 126, via REST API 124, to build a dependency analysis tree for each runtime object referenced by the policy (step 208). For example, for each application, enhanced policy editor 112 builds a list of objects (e.g., policies), that may be affected by changes to that application. Enhanced policy editor 112 uses the dependency tree to provide notifications for changes in objects remotely associated with a particular policy to avoid, for example, referencing a URI that is no longer available.

Figure 3:
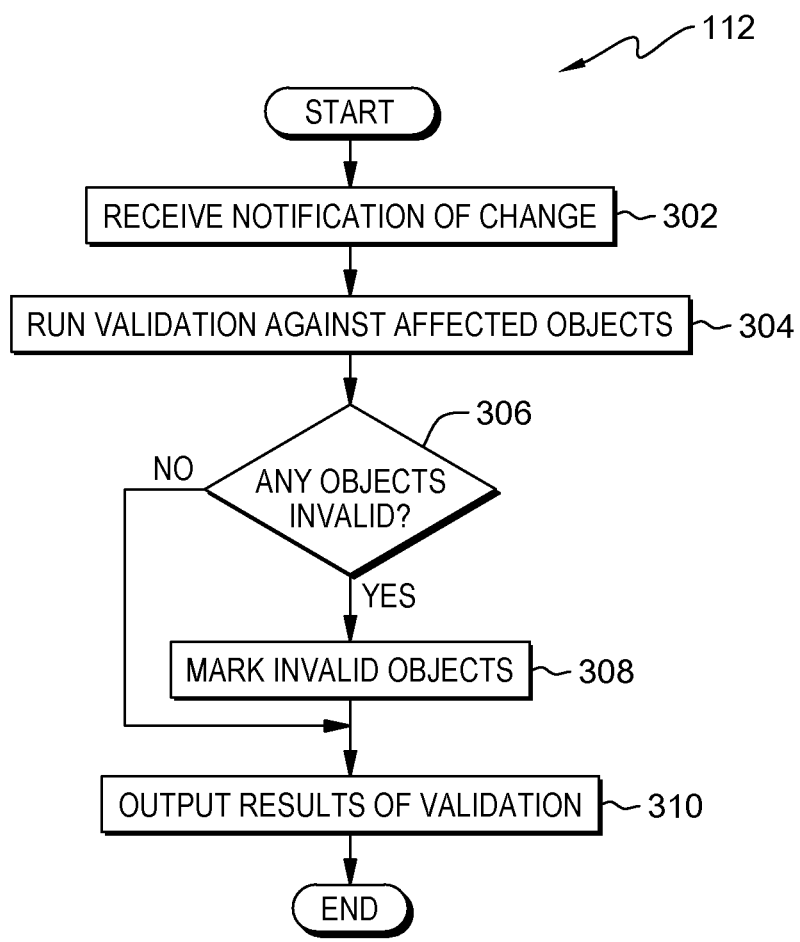
FIG. 3 illustrates operational steps of the enhanced policy editor, on the client computing device within the distributed data processing environment of FIG. 1, in accordance with an embodiment of the present invention.

FIG. 3 illustrates operational steps of enhanced policy editor 112, on client computing device 104 within distributed data processing environment 100 of FIG. 1, in accordance with an embodiment of the present invention. FIG. 3 describes the steps enhanced policy editor 112 takes to provide on demand validation.

Enhanced policy editor 112 receives a notification of a change (step 302). After a user creates a policy or while a user edits a policy, if any objects or resources associated with the policy have changed, subscription manager 128 notifies enhanced policy editor 112. In the embodiment depicted in FIG. 1, on receipt of the notification, enhanced policy editor 112 delegates to callback handler component 116. Changes to objects or resources may include unavailability, such as a selected server being down. Changes to objects or resources may also include a resource becoming obsolete or deleted. In addition, changes to objects or resources may include movement of the object or resource to a different location. In one embodiment, the received notification includes the information regarding what has changed. In another embodiment, the received notification simply notes a change has occurred, and enhanced policy editor 112 may issue a REST call to determine which resource has changed or how the resource has changed.

Enhanced policy editor 112 runs a validation against affected objects (step 304). In response to receiving notification of a change, enhanced policy editor 112 runs a validation against affected objects from the dependency tree, as discussed with respect to FIG. 2. In the embodiment depicted in FIG. 1, enhanced policy editor 112 runs the validation using validation component 118. Running the validation in this manner offers the user a compile-like experience for web defined resources.

Enhanced policy editor 112 determines whether any objects are invalid (decision block 306). Enhanced policy editor 112 analyzes the results of the validation to determine whether any objects referenced by the policy have become invalid due to the changes captured in the notification. If enhanced policy editor 112 determines any objects are invalid ("yes" branch, decision block 306), then enhanced policy editor 112 marks the invalid objects (step 308). Enhanced policy editor 112 marks the invalid objects with errors or warnings.

Responsive to marking the invalid objects or if enhanced policy editor 112 determines no objects are invalid ("no" branch, decision block 306), then enhanced policy editor 112 outputs the results of the validation (step 310). In an embodiment where the validation was run as a user is editing a policy, enhanced policy editor 112 may output the results as a pop-up box on a display associated with client computing device 104, via policy editor user interface 110. In an embodiment where the validation was run at a time when the user was not editing the policy, enhanced policy editor 112 may output the results in an email or text message to the user of client computing device 104, via policy editor user interface 110. In a further embodiment, the user may prompt enhanced policy editor 112, via policy editor user interface 110, to determine whether any objects have become invalid since the last time the user edited the policy. In the described embodiments, the notification may include details of the changes or a list of one or more objects that have become invalid due to the changes. In one embodiment, enhanced policy editor 112 may offer suggestions for replacements of objects that have become obsolete or that were deleted. If enhanced policy editor 112 did not find any invalid objects, then enhanced policy editor 112 may provide a message stating the validation was run and no invalid objects were found. In one embodiment, the message may include a timestamp for when enhanced policy editor 112 ran the validation.

In an example of an operation of enhanced policy editor 112, a user creates or edits a policy, and uses enhanced policy editor 112's feature of completion support, i.e., content assist, to fill in URI values with valid selections. The user types in a URI such as "host:1234/root/" where "1234" is a sample port number, and then invokes enhanced policy editor 112 to get a list of choices for the completion of the URI. In one embodiment, the user invokes enhanced policy editor 112 by pressing "Ctrl+space" on the keyboard associated with client computing device 104. In another embodiment, the user may invoke enhanced policy editor 112 by tapping a touch screen associated with client computing device 104. In one embodiment, enhanced policy editor 112 displays the list of choices as a numbered or bulleted list in a popup window. In another embodiment, enhanced policy editor 112 may display the list of choices as a text string following the URI fragment from which the user can click or tap to make a selection.

In response to the user invoking enhanced policy editor 112, enhanced policy editor 112 invokes one or more REST APIs, such as REST API 124, to determine valid choices for completing the URI fragment that are available at the time the user invoked enhanced policy editor 112. Enhanced policy editor 112 receives the results of the REST calls, parses the received content, and displays a list of valid choices. In the example, enhanced policy editor 112 displays the choices "servers, policy, data." The user chooses "servers." At the time the user makes the choice, enhanced policy editor 112 sets up a callback on the root that will provide notifications of changes to servers. When the user chooses "servers," enhanced policy editor 112 displays a list of valid choices.

In the example, enhanced policy editor 112 displays the choices "server1, server2." The user chooses "server1." At the time the user makes the choice, enhanced policy editor 112 sets up a callback on the root that will provide notifications of changes to server1. When the user chooses "server1," enhanced policy editor 112 displays a list of valid choices.

In the example, enhanced policy editor 112 displays the choices "applications, services, databases, libraries." The user chooses "applications." At the time the user makes the choice, enhanced policy editor 112 sets up a callback on the root that will provide notifications of changes to applications.

Thus, the content assist function of enhanced policy editor 112 provides lists of valid choices by invoking REST API calls, and the on demand validation function of enhanced policy editor 112 sets up callbacks for each object in which the user registers an interest which will notify the user when a change is detected. In one embodiment, enhanced policy editor 112 issues a REST API call to populate a list of choices for just the next element of the final URI, and waits for a user prompt to provide additional choices. In another embodiment, enhanced policy editor 112 issues one or more REST API calls to populate a list of choices for the next element of the URI as soon as the user has made a choice. In a further embodiment, enhanced policy editor 112 may request a full hierarchy of choices by using a depth parameter and filter the hierarchy accordingly, showing the choices at each step, enabling enhanced policy editor 112 to handle a single network request, while requiring additional filtering by policy editor component 114.

Figure 4:
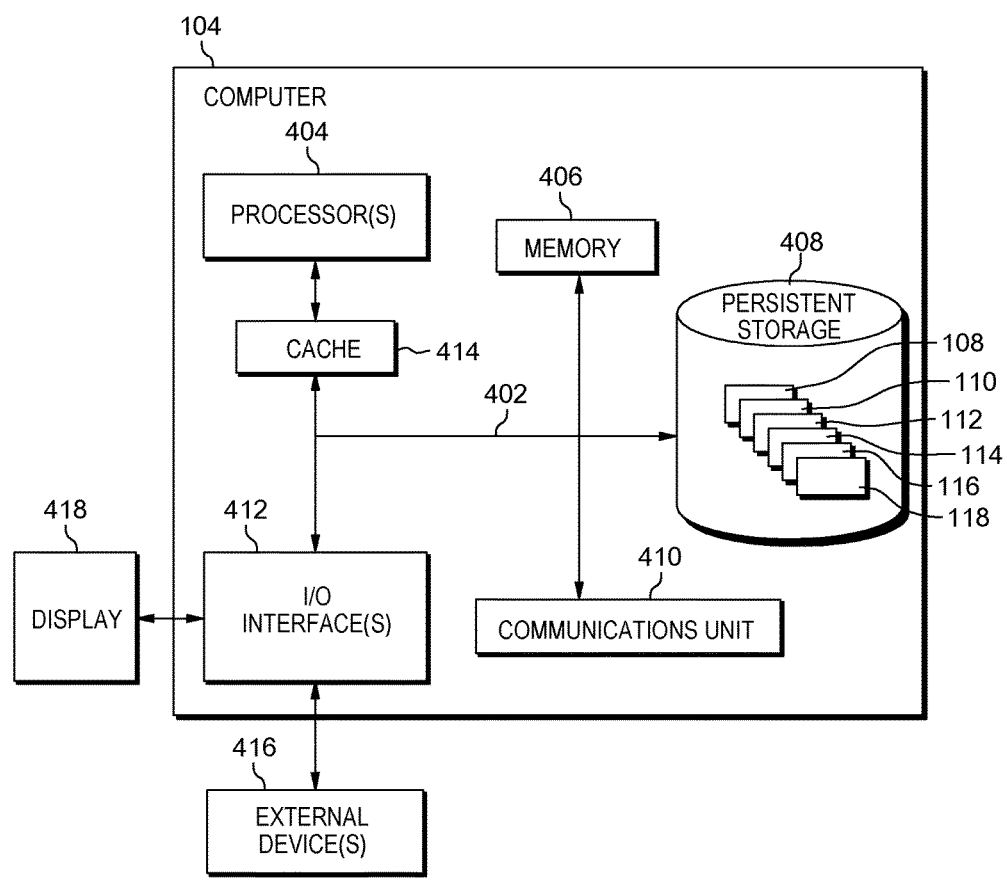
FIG. 4 depicts a block diagram of components of the client computing device executing the enhanced policy editor within the distributed data processing environment of FIG. 1, in accordance with an embodiment of the present invention.

FIG. 4 depicts a block diagram of components of client computing device 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Client computing device 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., web user interface 108, policy editor user interface 110, enhanced policy editor 112, policy editor component 114, callback handler component 116, and validation component 118 are stored in persistent storage 408 for execution and/or access by one or more of the respective processor(s) 404 of client computing device 104 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 120. In these examples, communications unit 410 includes one or more network interface cards. Communications unit 410 may provide communications through the use of either or both physical and wireless communications links. Web user interface 108, policy editor user interface 110, enhanced policy editor 112, policy editor component 114, callback handler component 116, and validation component 118 may be downloaded to persistent storage 408 of client computing device 104 through communications unit 410.

I/O interface(s) 412 allows for input and output of data with other devices that may be connected to client computing device 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., web user interface 108, policy editor user interface 110, enhanced policy editor 112, policy editor component 114, callback handler component 116, and validation component 118 on client computing device 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing completion support and on demand validation in a web tool that operates on live resources, the method comprising:

creating, by one or more computer processors, one or more lists of content, wherein the one or more lists of content include one or more references to one or more runtime objects, and wherein the creating of the one or more lists of content occurs prior to runtime;

parsing, by the one or more computer processors, the one or more lists of content;

populating, by the one or more computer processors, one or more lists of one or more choices with the parsed one or more lists of content;

creating, by the one or more computer processors, one or more callbacks for one or more runtime objects referenced by the one or more lists of one or more choices;

building, by the one or more computer processors, a dependency tree that includes at least one of the one or more runtime objects referenced by the one or more lists of content;

receiving, by the one or more computer processors, a notification of a change to one or more of the referenced one or more runtime objects;

issuing, by the one or more computer processors, one or more representational state transfer (REST) application programming interface (API) calls to determine details of the change to one or more of the referenced one or more runtime objects;

running, by the one or more computer processors, a validation against the one or more changed referenced one or more runtime objects;

determining, by the one or more computer processors, whether one or more of the one or more changed referenced one or more runtime objects is invalid;

responsive to determining one or more of the one or more changed referenced one or more runtime objects is invalid, marking, by the one or more computer processors, the invalid changed referenced one or more runtime objects; and outputting, by the one or more computer processors, results of the validation, wherein the results include one or more suggestions for replacing the invalid changed referenced one or more runtime objects.

2. The method of claim 1, further comprising displaying, by the one or more computer processors, the one or more lists of one or more choices.

3. The method of claim 1, wherein receiving a notification of a change to one or more of the referenced one or more runtime objects results from creation of the one or more callbacks.

4. The method of claim 1, further comprising applying, by the one or more computer processors, one or more types of one or more filters to the one or more lists of content, wherein one or more types of one or more filters includes at least one of a type filter and a predicate filter.

5. The method of claim 1, wherein content in the one or more lists of content includes one or more elements of a uniform resource identifier.

6. The method of claim 1, wherein parsing the one or more lists of content further comprises determining, by the one or more computer processors, a name of at least one of the one or more runtime objects.

7. The method of claim 1, wherein populating the one or more lists of one or more choices with the parsed one or more lists of content further comprises:

requesting, by the one or more computer processors, a full hierarchy of the one or more choices using a depth parameter; and filtering, by the one or more computer processors, the hierarchy.

8. A computer program product for providing completion support and on demand validation in a web tool that operates on live resources, the computer program product comprising:

one or more computer readable storage device and program instructions stored on the one or more computer readable storage device, the stored program instructions comprising:

program instructions to create one or more lists of content, wherein the one or more lists of content include one or more references to one or more runtime objects, and wherein the creating of the one or more lists of content occurs prior to runtime;

program instructions to parse the one or more lists of content;

program instructions to populate one or more lists of one or more choices with the parsed one or more lists of content;

program instructions to create one or more callbacks for one or more runtime objects referenced by the one or more lists of one or more choices;

program instructions to build a dependency tree that includes at least one of the one or more runtime objects referenced by the one or more lists of content;

program instructions to receive a notification of a change to one or more of the referenced one or more runtime objects;

program instructions to issue one or more representational state transfer (REST) application programming interface (API) calls to determine details of the change to one or more of the referenced one or more runtime objects;

program instructions to run a validation against the one or more changed referenced one or more runtime objects;

program instructions to determine whether one or more of the one or more changed referenced one or more runtime objects is invalid;

responsive to determining one or more of the one or more changed referenced one or more runtime objects is invalid, program instructions to mark the invalid changed referenced one or more runtime objects; and program instructions to output results of the validation, wherein the results include one or more suggestions for replacing the invalid changed referenced one or more runtime objects.

9. The computer program product of claim 8, the stored program instructions further comprising program instructions to display the one or more lists of one or more choices.

10. The computer program product of claim 8, wherein the program instructions to receive a notification of a change to one or more of the referenced one or more runtime objects results from creation of the one or more callbacks.

11. The computer program product of claim 8, the stored program instructions further comprising program instructions to apply one or more types of one or more filters to the one or more lists of content, wherein one or more types of one or more filters includes at least one of a type filter and a predicate filter.

12. The computer program product of claim 8, wherein content in the one or more lists of content includes one or more elements of a uniform resource identifier.

13. The computer program product of claim 8, wherein the program instructions to parse the one or more lists of content comprise program instructions to determine a name of at least one of the one or more runtime objects.

14. The computer program product of claim 8, wherein the program instructions to populate the one or more lists of one or more choices with the parsed one or more lists of content comprise:

program instructions to request a full hierarchy of the one or more choices using a depth parameter; and program instructions to filter the hierarchy.

15. A computer system for providing completion support and on demand validation in a web tool that operates on live resources, the computer system comprising:

one or more computer processors;

one or more computer readable storage device;

program instructions stored on the one or more computer readable storage device for execution by at least one of the one or more computer processors, the stored program instructions comprising:

program instructions to create one or more lists of content, wherein the one or more lists of content include one or more references to one or more runtime objects, and wherein the creating of the one or more lists of content occurs prior to runtime;

program instructions to parse the one or more lists of content;

program instructions to populate one or more lists of one or more choices with the parsed one or more lists of content;

program instructions to create one or more callbacks for one or more runtime objects referenced by the one or more lists of one or more choices;

program instructions to build a dependency tree that includes at least one of the one or more runtime objects referenced by the one or more lists of content;
program instructions to receive a notification of a change to one or more of the referenced one or more runtime objects;
program instructions to issue one or more representational state transfer (REST) application programming interface (API) calls to determine details of the change to one or more of the referenced one or more runtime objects;
program instructions to run a validation against the one or more changed referenced one or more runtime objects;
program instructions to determine whether one or more of the one or more changed referenced one or more runtime objects is invalid;
responsive to determining one or more of the one or more changed referenced one or more runtime objects is invalid, program instructions to mark the invalid changed referenced one or more runtime objects; and
program instructions to output results of the validation, wherein the results include one or more suggestions for replacing the invalid changed referenced one or more runtime objects.

16. The computer system of claim 15, the stored program instructions further comprising program instructions to display the one or more lists of one or more choices.

17. The computer system of claim 15, wherein the program instructions to receive a notification of a change to one or more of the referenced one or more runtime objects results from creation of the one or more callbacks.

18. The computer system of claim 15, the stored program instructions further comprising program instructions to apply one or more types of one or more filters to the one or more lists of content, wherein one or more types of one or more filters includes at least one of a type filter and a predicate filter.

19. The computer system of claim 15, wherein content in the one or more lists of content includes one or more elements of a uniform resource identifier.

20. The computer system of claim 15, wherein the program instructions to parse the one or more lists of content comprise program instructions to determine a name of at least one of the one or more runtime objects.

* * * * *